US010198540B1

(12) United States Patent
Cohen

(10) Patent No.: US 10,198,540 B1
(45) Date of Patent: Feb. 5, 2019

(54) SYSTEM AND METHOD FOR PROFILING DURING AN ELECTRONIC DESIGN SIMULATION

(71) Applicant: Cadence Design Systems, Inc., San Jose, CA (US)

(72) Inventor: Daniel Asher Cohen, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 948 days.

(21) Appl. No.: 14/039,116

(22) Filed: Sep. 27, 2013

(51) Int. Cl.
*G06F 17/50* (2006.01)
*G06F 11/36* (2006.01)

(52) U.S. Cl.
CPC ...... *G06F 17/5031* (2013.01); *G06F 11/3636* (2013.01)

(58) Field of Classification Search
CPC ............ G06F 17/5022; G06F 17/5036; G06F 17/5045; G06F 17/5009; G06F 2217/78; G06F 11/3447; G06F 11/3457; G06F 11/3636; G06F 17/5031; G06F 2217/84; G01R 31/318364
See application file for complete search history.

(56) References Cited

U.S. PATENT DOCUMENTS

| | | | | |
|---|---|---|---|---|
| 5,838,949 A * | 11/1998 | Hassoun | ............. | G06F 17/5022 703/13 |
| 6,152,612 A * | 11/2000 | Liao | .................... | G06F 17/5022 703/15 |
| 6,751,583 B1 * | 6/2004 | Clarke | ................ | G06F 17/5022 703/17 |
| 6,823,497 B2 * | 11/2004 | Schubert | ............ | G06F 17/5022 716/106 |
| 6,856,951 B2 * | 2/2005 | Moona | ................ | G06F 11/3447 703/14 |
| 6,865,526 B1 * | 3/2005 | Henkel | ............... | G06F 17/5022 703/18 |
| 7,260,798 B2 * | 8/2007 | Gupta | ............ | G01R 31/318314 716/104 |
| 7,558,719 B1 * | 7/2009 | Donlin | ................ | G06F 17/5045 703/14 |

(Continued)

OTHER PUBLICATIONS

I. Mavroidis, "Novel Techniques for Hardware/Software Partitioning and Emulation." PhD dissertation, Technical University of Crete, 2011, 139 pages.*

*Primary Examiner* — Jay Hann
(74) *Attorney, Agent, or Firm* — Mark H. Whittenberger, Esq.; Holland & Knight LLP

(57) ABSTRACT

The present disclosure relates to a computer-implemented method for electronic design simulation using a profiler. The method may include simulating, using a computing device, an electronic design associated with a programming language. The method may further include recording a first time corresponding to a first user-defined point in the simulation. The method may also include recording a second time corresponding to a second user-defined point in the simulation. The method may further include determining a difference in time between the first and second times and displaying a visualization including at least one of the first time, the second time, a value of a variable at the first time, a value of the variable at a second time, and the difference in time.

12 Claims, 7 Drawing Sheets

(56) References Cited

U.S. PATENT DOCUMENTS

| | | | | |
|---|---|---|---|---|
| 8,229,723 | B2* | 7/2012 | Srinivasan | G06F 17/5022 |
| | | | | 703/14 |
| 8,799,850 | B2* | 8/2014 | Ganzhorn | G06F 17/5045 |
| | | | | 703/13 |
| 2001/0021903 | A1* | 9/2001 | Ryu | G06F 17/5022 |
| | | | | 703/14 |
| 2003/0005404 | A1* | 1/2003 | Bowyer | G06F 17/5022 |
| | | | | 716/104 |
| 2006/0241921 | A1* | 10/2006 | Willis | G06F 17/5036 |
| | | | | 703/2 |
| 2009/0216515 | A1* | 8/2009 | Moorby | G06F 17/5022 |
| | | | | 703/14 |
| 2011/0283247 | A1* | 11/2011 | Ho | G06F 11/3636 |
| | | | | 716/107 |
| 2013/0246987 | A1* | 9/2013 | Ardeishar | G06F 17/5045 |
| | | | | 716/106 |

* cited by examiner

SYSTEM AND METHOD FOR PROFILING DURING AN ELECTRONIC DESIGN SIMULATION

FIELD OF THE INVENTION

The present disclosure relates to electronic design simulation, and more specifically, to a method for profiling during an electronic design simulation.

DISCUSSION OF THE RELATED ART

Electronic design automation (EDA) utilizes software tools that may be used in the design and analysis of numerous electronic systems such as printed circuit boards (PCBs) and integrated circuits (ICs). Verification environments include constraints that describe the relationship between the variables that control the simulation (and sometimes the data that is used as well). For example, in order to verify certain IC designs many simulations are run, which may verify different aspects of the design being tested. Each test may run for a certain amount of design time (usually measured in clock cycles) and a certain amount of user time. Users are very interested in running the simulations as fast as possible. Profiling tools show how much user time is spent running each part of the design and test bench code. However, users often find it difficult to identify which parts of the simulation can be optimized for better performance. Existing profilers are unable to indicate how long each frame takes to go through simulation, whether the address in the transaction payload impacts the simulation time for a transaction, the timing of memory loads, where the user should start adding backdoor loads, and which block has the longest set-up time, etc.

SUMMARY OF INVENTION

In one or more embodiments of the present disclosure, a computer-implemented method for electronic design simulation using a profiler is provided. The method may include simulating, using a computing device, an electronic design associated with a programming language. The method may further include recording a first time corresponding to a first user-defined point in the simulation. The method may also include recording a second time corresponding to a second user-defined point in the simulation. The method may further include determining a difference in time between the first and second times and displaying a visualization including at least one of the first time, the second time, a value of a variable at the first time, a value of the variable at a second time, and the difference in time.

One or more of the following features may be included. In some embodiments, the programming language may be one of C, C++, Verilog, and SystemVerilog. The method may further include accessing the electronic design using a direct programming interface (DPI). In some embodiments, the first user-defined point may be associated with a breakpoint in a graphical debugging environment. In some embodiments, the profiler may be associated with a base class library. In some embodiments, the first user-defined point in the simulation may correspond to a starting point in the simulation and the second user-defined point may correspond to an ending point in the simulation. In some embodiments, the method may include identifying a value of the variable at the first time and/or the second time.

In some embodiments, a computer-readable storage medium for electronic design simulation using a profiler is provided. The computer-readable storage medium may have stored thereon instructions, which when executed by a processor result in one or more operations. Operations may include simulating, using a computing device, an electronic design associated with a programming language. Operations may further include recording a first time corresponding to a first user-defined point in the simulation. Operations may also include recording a second time corresponding to a second user-defined point in the simulation. Operations may further include determining a difference in time between the first and second times and displaying a visualization including at least one of the first time, second time, a value of a variable at the first time, a value of the variable at a second time, and the difference in time.

One or more of the following features may be included. In some embodiments, the programming language may be one of C, C++, Verilog, and SystemVerilog. Operations may further include accessing the electronic design using a direct programming interface (DPI). In some embodiments, the first user-defined point may be associated with a breakpoint in a graphical debugging environment. In some embodiments, the profiler may be associated with a base class library. In some embodiments, the first user-defined point in the simulation may correspond to a starting point in the simulation and the second user-defined point may correspond to an ending point in the simulation. In some embodiments, the method may include identifying a value of the variable at the first time and/or the second time.

In one or more embodiments of the present disclosure, a system is provided. The system may include one or more processors configured to simulate an electronic design associated with a programming language. The one or more processors may be further configured to record a first time corresponding to a first user-defined point in the simulation. The one or more processors may be further configured to record a second time corresponding to a second user-defined point in the simulation. The one or more processors may be further configured to determine a difference in time between the first and second times and displaying a visualization including at least one of the first time, second time, a value of the variable at a first time, a value of the variable at a second time, and the difference in time.

One or more of the following features may be included. In some embodiments, the programming language may be one of C, C++, Verilog, and SystemVerilog. The one or more processors may be further configured to access the electronic design using a direct programming interface (DPI). In some embodiments, the first user-defined point may be associated with a breakpoint in a graphical debugging environment. In some embodiments, the profiler may be associated with a base class library. In some embodiments, the first user-defined point in the simulation may correspond to a starting point in the simulation and the second user-defined point may correspond to an ending point in the simulation. In some embodiments, the method may include identifying a value of the variable at the first time and/or the second time.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
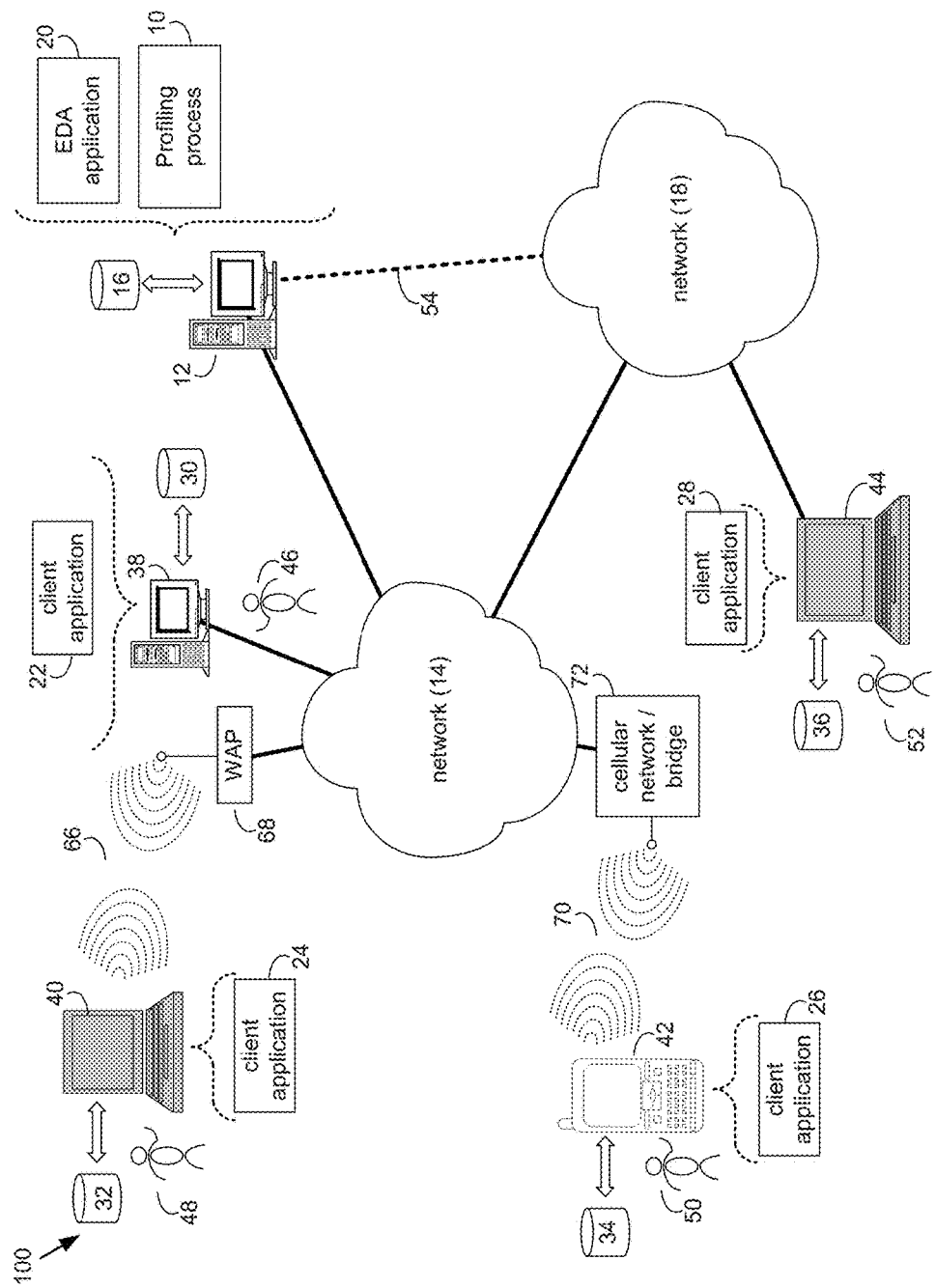
FIG. 1 is a system diagram depicting aspects of the profiling process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a profiling process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the profiling process may reside on and be executed, in whole or in part, by a client electronic device, such as a personal computer, notebook computer, personal digital assistant, or the like.

The instruction sets and subroutines of profiling process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Profiling process 10 may be a stand alone application, or may be an applet/application/script that may interact with and/or be executed within EDA application 20. In addition/as an alternative to being a server-side process, the profiling process may be a client-side process (not shown) that may reside on a client electronic device (described below) and may interact with an EDA client application (e.g., one or more of EDA client applications 22, 24, 26, 28). Further, the profiling process may be a hybrid server-side/client-side process that may interact with EDA application 20 and an EDA client application (e.g., one or more of client applications 22, 24, 26, 28). As such, the profiling process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize profiling process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
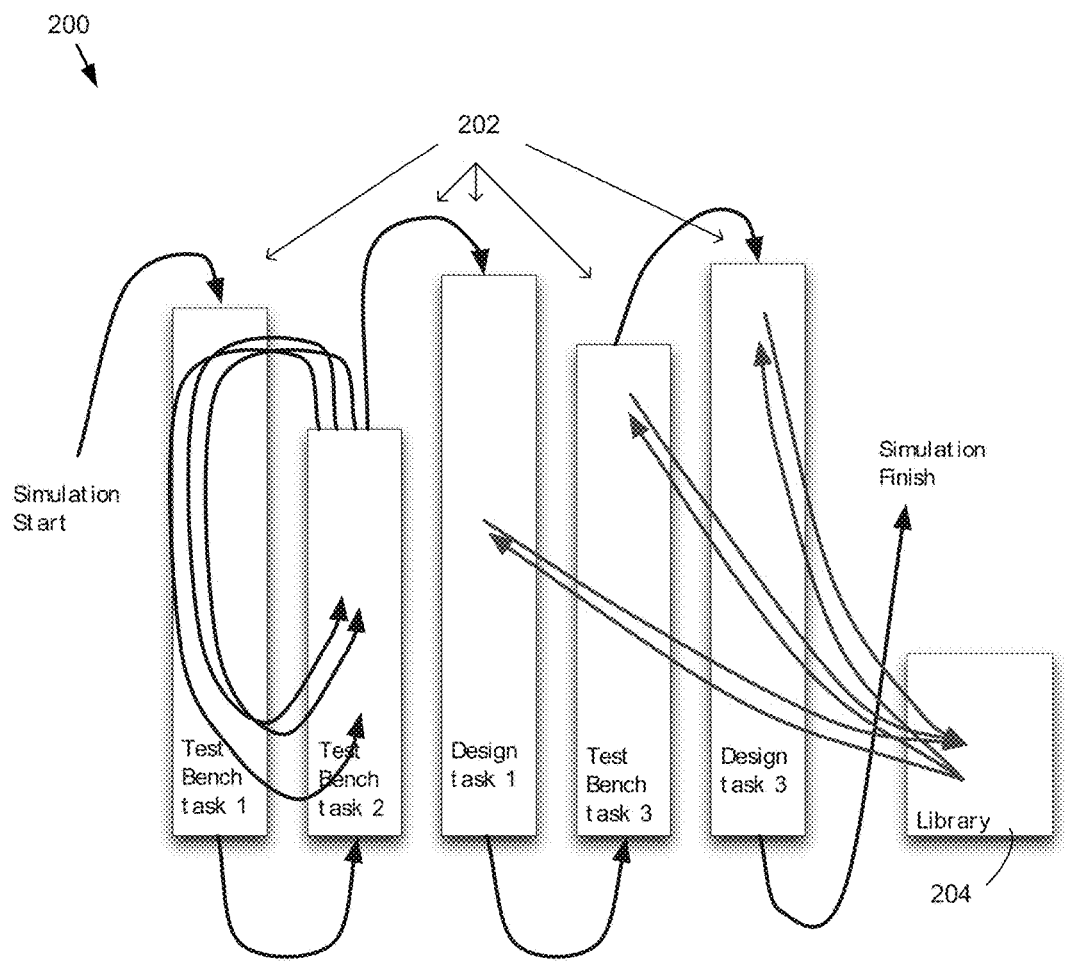
FIG. 2 is a system diagram depicting aspects of the profiling process in accordance with an embodiment of the present disclosure.

Referring now to FIG. 2, the profilers used in existing simulators work by interrupting the simulation at constant user time intervals and querying the simulator engine to determine what part of the user design or test bench being worked on. The diagram shown in FIG. 2 represents a test bench and design running in simulation. The lines represent the flow through the code, modules 202 represent functions, files or tasks in the code. Library file 204 contains functions that are used throughout the test bench and design.

```
A sample based approach may generate the following table:
------------------------------------------------------------
Stream Counts (6019 hits total)
------------------------------------------------------------
    % hits   # hits   # inst   name
    80.1     4821     [ 1]     Always stmt (file: ../dut/pll.sv, line: 9 in dut.pll [module])
     3.1      186     [  ]     Method SSS_KM_CL2TA (method)
     1.5       90     [ 1]     Task collect transaction (file: ../gpio_agent/gpio_agent_interface.sv, line: 17
in worklib.gpio_agent_interface [module])
     1.1       64     [  ]     Method SSS_KM_FINDRFT (method)
     1.0       61     [  ]     POSEDGE WAKEUP, head, tail, rtn (method)
     1.0       59     [ 1]     Always stmt (file: ../hw_top/clkgen.sv, line: 9 in hw_top.clkgen [module])
     0.8       51     [  ]     Anonymous continuous assignment (file: ../hw_top/hw_top.sv, line/pos: 53/87
in worklib.hw_top [module])
     0.8       46     [ 1]     Always stmt (file: ../dut/pll.sv, line: 3 in dut.pll [module])
     0.7       41     [  ]     Method SSS_MT_DU_BYTENFW (method)
     0.6       38     [ 1]     Always stmt (file: ../dut/dut.sv, line: 103 in dut.dut [module])
     0.6       34     [  ]     Method SSS_KM_NFORCE (method)
     0.5       31     [ 1]     Force (file: /home/dcohen/cadence/installs/latest_uxe/tools.lnx86/etc/ixcom/
IXCclkgen.sv, line: 466 in IXCclkgen.ixc_clkbind [module])
     0.5       30     [  ]     Method SSS_MT_ENTPES (method)
     0.4       23     [ 2]     Always stmt (file: ../hw_top/memory.sv, line: 14 in worklib.memory [module])
     0.3       21     [  ]     Method SSS_MT_POSEDGE (method)
     0.3       17     [  ]     Method SSS_MT_DU_LONGNFW (method)
     0.3       17     [  ]     Method SSS_MT_RETURN_BYTE (method)
     0.3       17     [ 1]     Always stmt (file: ../dut/dut.sv, line: 64 in dut.dut [module])
     0.2       15     [ 1]     Anonymous continuous assignment (file: ../hw_top/hw_top.sv, line/pos: 95/46
in worklib.hw_top [module])
     0.2       14     [ 1]     Anonymous continuous assignment (file: ../hw_top/clkgen.sv, line/pos: 15/49
in hw_top.clkgen [module])
     0.2       13     [  ]     Method SSS_MT_SVHASSIGN (method)
     0.2       13     [ 2]     Non-blocking Assignment (file: ../hw_top/memory.sv, line: 16 in
worklib.memory [module])
     0.2       13     [  ]     Anonymous continuous assignment (file: ../hw_top/hw_top.sv, line/pos: 77/23
in worklib.hw_top [module])
     0.2       12     [  ]     Method SSS_MT_ENABLEN_LONG (method)
     0.2       11     [ 1]     Non-blocking Assignment (file: ../dut/dut.sv, line: 105 in dut.dut [module])
     0.2       10     [ 2]     Anonymous continuous assignment (file: ../hw_top/memory.sv, line/pos: 32/35
in worklib.memory [module])
     0.2       10     [ 1]     Anonymous continuous assignment (file: ../hw_top/hw_top.sv, line/pos: 64/41
in worklib.hw_top [module])
     0.2       10     [ 1]     Non-blocking Assignment (file: ../dut/dut.sv, line: 108 in dut.dut [module])
     0.1        9     [ 1]     Always stmt (file: ../clock_and_reset_agent/clock_and_reset_agent_interface.sv,
line: 65 in worklib.clock_and_reset_agent_interface [module])
     0.1        9     [ 1]     Non-blocking Assignment (file: ../dut/dut.sv, line: 109 in dut.dut [module])
     0.1        8     [  ]     engine support
     0.1        8     [ 1]     Anonymous continuous assignment (file: ../hw_top/hw_top.sv, line/pos: 73/41
in worklib.hw_top [module])
     0.1        8     [ 1]     Non-blocking Assignment (file: ../dut/dut.sv, line: 106 in dut.dut [module])
     0.17             [ 1]     Function uvm_create_random_seed (file: /home/dcohen/cadence/installs/
latest/tools/uvm/uvm_lib/uvm_sv/sv/base/uvm_misc.svh, line: 422 in worklib.uvm_pkg [package])
------------------------------------------------------------
Most Active Modules (behavioral)
------------------------------------------------------------
    % hits   # hits   # inst   name
    81.2     4888     [ 1]     dut.pll:sv (file: ../dut/pll.sv line: 1)
     2.2      130     [ 1]     dut.dut:sv (file: ../dut/dut.sv line: 15)
     1.5       90     [ 1]     worklib.gpio_agent_interface:sv (file: ../gpio_agent/gpio_agent_interface.sv
line: 8)
     1.4       84     [ 1]     hw_top.clkgen:sv (file: ../hw_top/clkgen.sv line: 5)
     1.1       65     [ 2]     worklib.memory:sv (file: ../hw_top/memory.sv line: 3)
     1.0       61     [ 1]     worklib.hw_top:sv (file: ../hw_top/hw_top.sv line: 17)
     0.6       38     [ 1]     worklib.uvm_pkg:sv (file:
/home/dcohen/cadence/installs/latest/tools/uvm/uvm_lib/uvm_sv/sv/uvm_pkg.sv line: 27)
```

| | | | |
|---|---|---|---|
| 0.5 | 31 | [ 1] | IXCclkgen.ixc_clkbind:sv (file: /home/dcohen/cadence/installs/latest_uxe/tools.lnx86/etc/ixcom/IXCclkgen.sv line: 462) |
| 0.1 | 9 | [ 1] | worklib.clock_and_reset_agent_interface:sv (file: ../clock_and_reset_agent/clock_and_reset_agent_interface.sv line: 7) |

Figure 3:
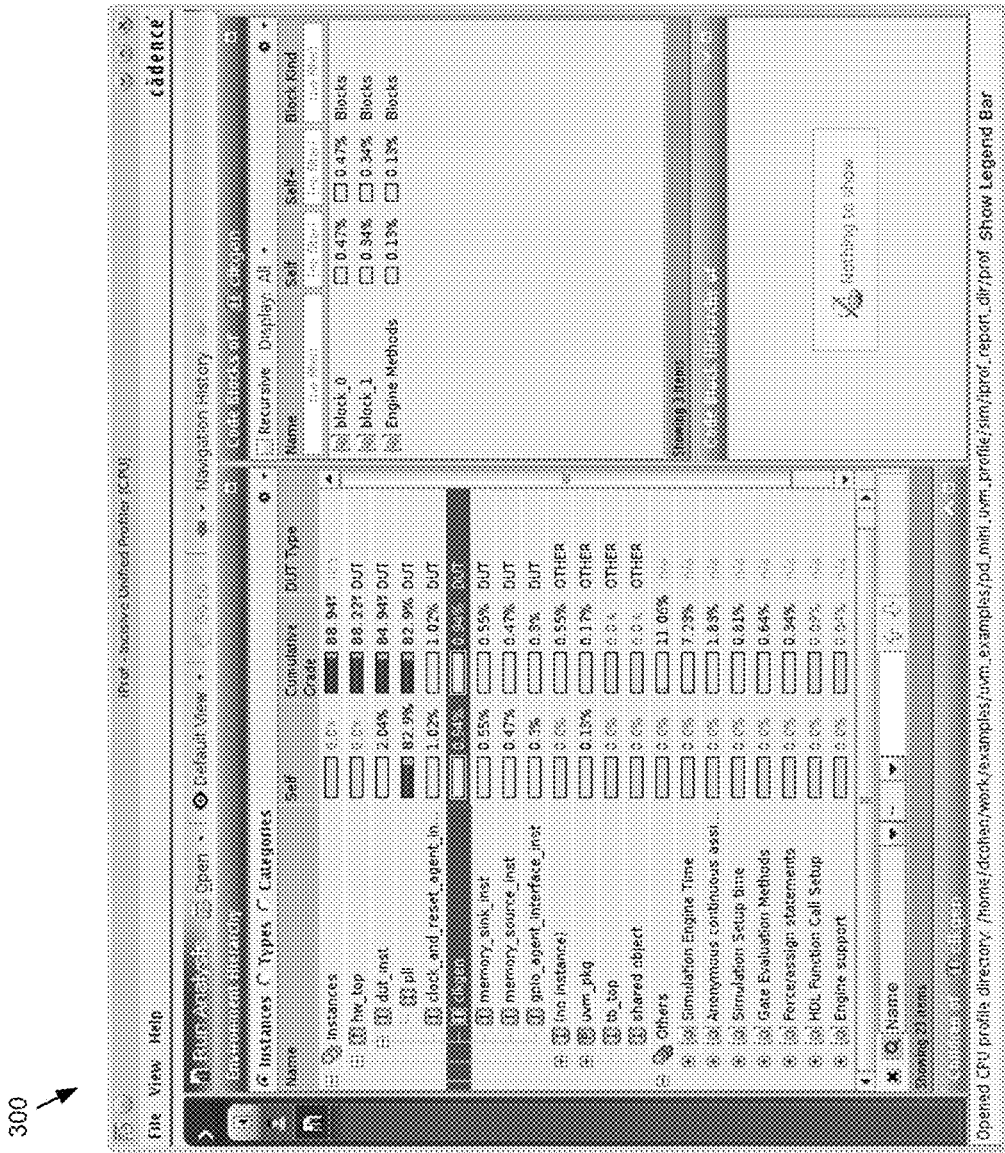
FIG. 3 is a system diagram depicting aspects of the profiling process in accordance with an embodiment of the present disclosure.

In this particular example, the profiler stopped and sampled the simulation engine 6019 times. Here, over 80% of the time the simulation was running in the pll function of the DUT module. A sample based approach can also be displayed graphically as is shown in FIG. 3.

Figure 4:
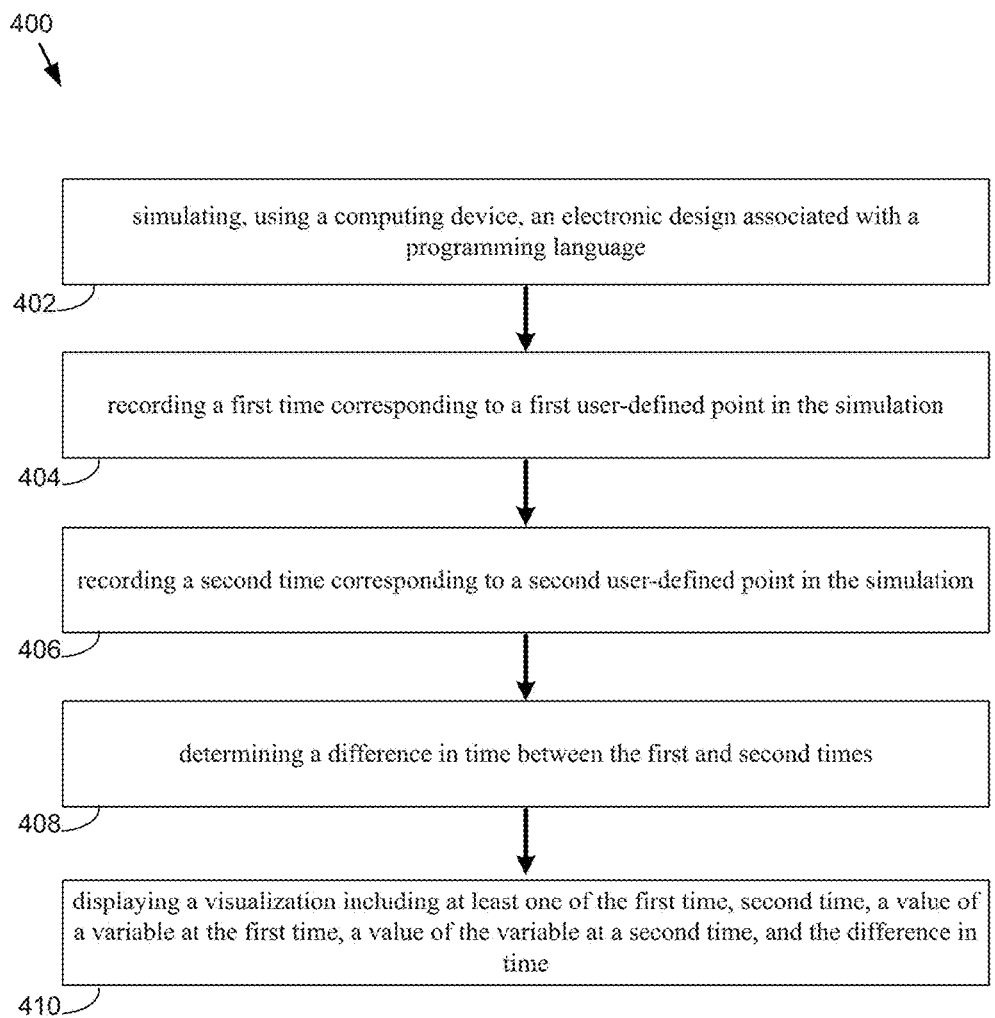
FIG. 4 is a flowchart depicting operations consistent with the profiling process of the present disclosure.

As shown in FIG. 4, and as will be discussed in further detail below, profiling process 10 of the present disclosure may include simulating (402), using a computing device, an electronic design associated with a programming language. The method may further include recording (404) a first time corresponding to a first user-defined point in the simulation. The method may also include recording (406) a second time corresponding to a second user-defined point in the simulation. The method may further include determining (408) a difference in time between the first and second times and displaying (410) a visualization including at least one of the first time, second time, value of the variable at the first time, value of the variable at the second time, and the difference in time.

Accordingly, rather than sampling the simulator engine at fixed time intervals profiling process 10 may be configured to record the time at which a certain user-defined points in the code are reached. When each point is reached the time since the last point and since the last time this point was reached may be recorded. The difference in time between each of these points may also be calculated and the values of any variables flagged by the user also recorded.

Figure 5:
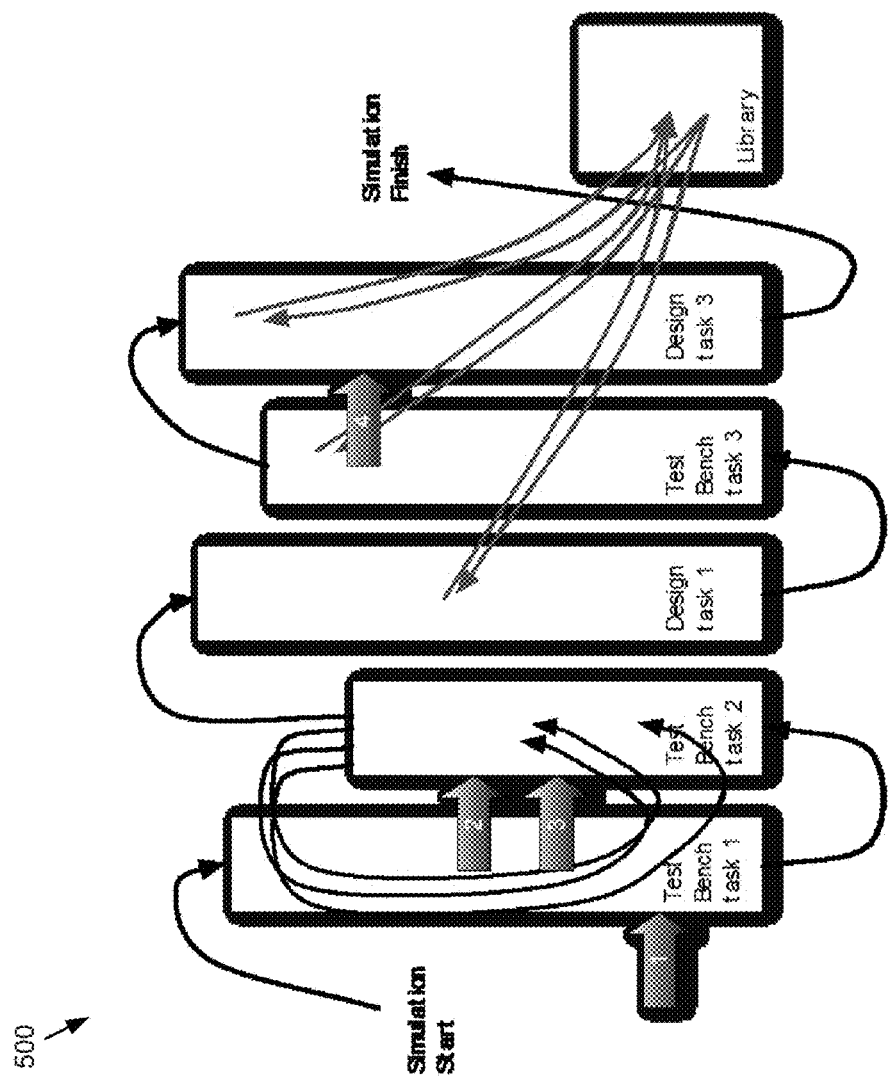
FIG. 5 is a system diagram depicting aspects of the profiling process in accordance with an embodiment of the present disclosure.

Referring now to FIG. 5, an embodiment similar to that shown in FIG. 2 is provided. However, in this embodiment, profiling process 10 has been applied to the electronic design simulation. In this example, the code between points 1 and 2, 2 and 3 and 2 and 4 may perform functions that the user is interested in timing.

Figure 6:
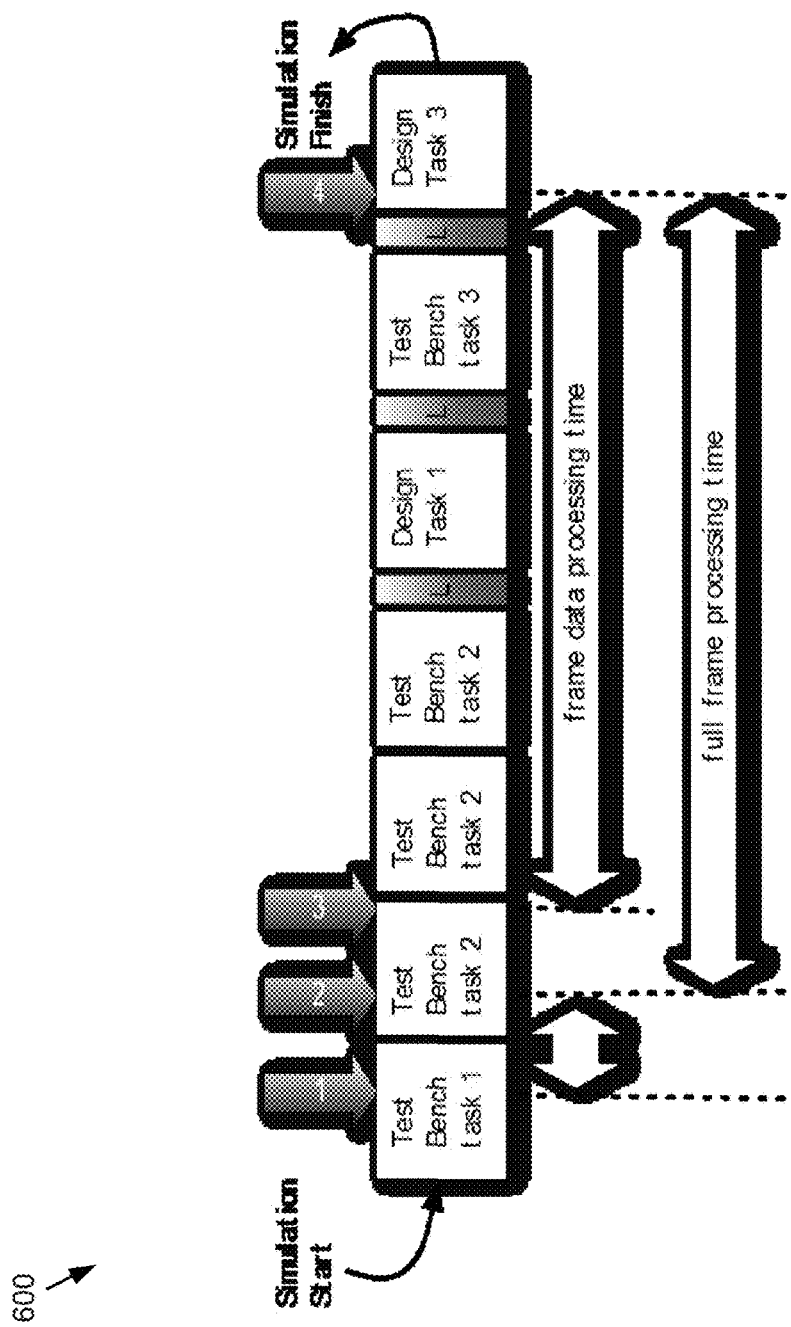
FIG. 6 is a system diagram depicting aspects of the profiling process in accordance with an embodiment of the present disclosure.

As is shown in FIG. 6, profiling process 10 may allow the test bench and design to be visualized in terms of the processing steps they perform, rather than into the individual blocks of code that come together to process each of these steps. In this way, profiling process 10 may also allow processing steps within a function to be individually inspected. The time between signal transitions can also be measured.

Figure 7:
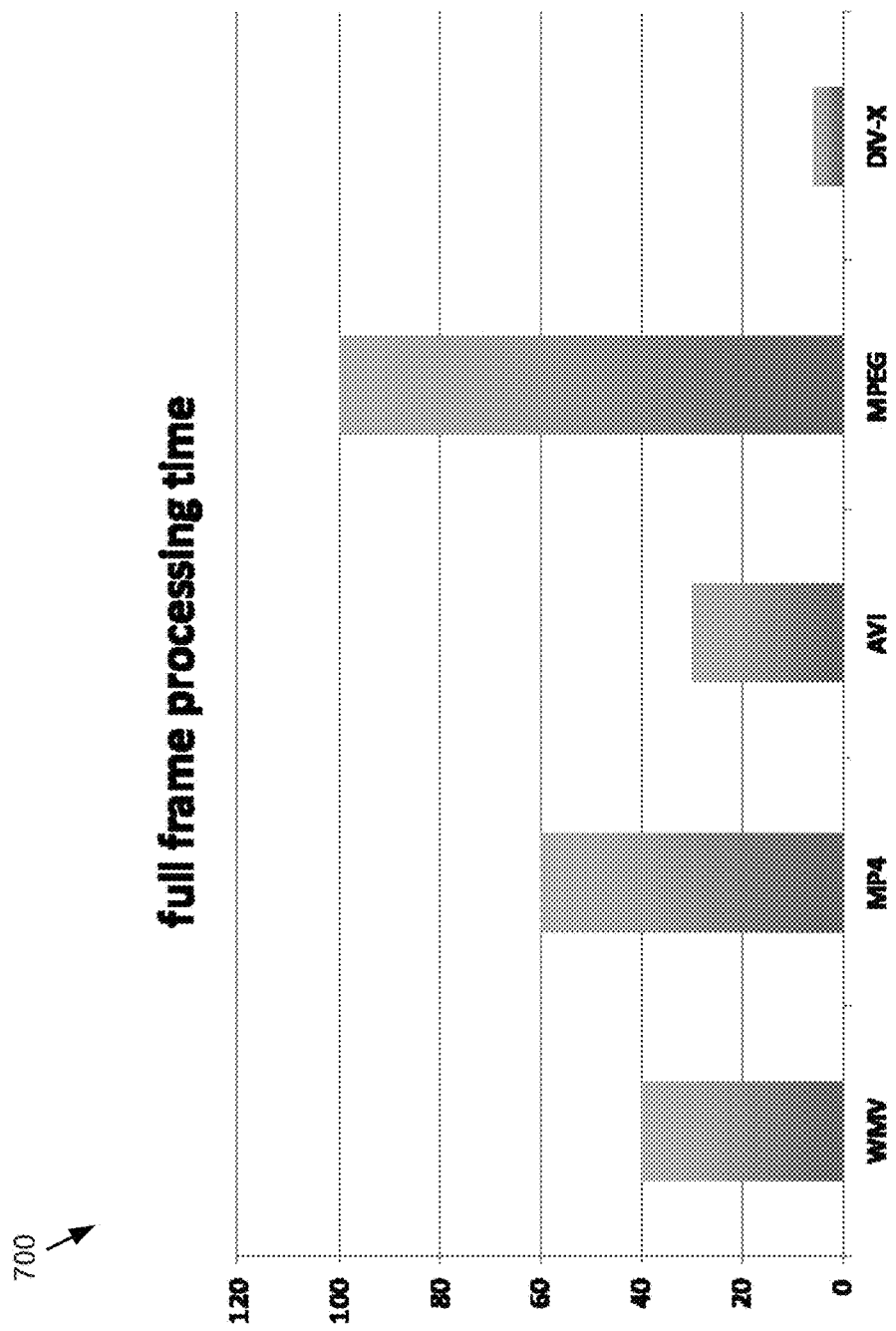
FIG. 7 is a system diagram depicting results generated in accordance with the profiling process consistent with an embodiment of the present disclosure.

In some embodiments, profiling process 10 may also provide that the signals indicated by the user are also recorded at each point, thus allowing the visualization of the impact of different signal values on the performance of the code. An example of this is shown in FIG. 7.

In some embodiments, profiling process 10 may be used in accordance with numerous languages as it may be accessed though a Direct Programming Interface ("DPI") call. Profiling process 10 may be used with any suitable programming language some of which may include, but are not limited to, C, C Verilog and SystemVerilog. The points to monitor may be inserted by modifying the user code or though breakpoints in the graphical debug environment.

In some embodiments, profiling process 10 may also be inserted as part of a base class library. For example, with the universal verification methodology ("UVM") library a watch point may be added to the start and end of each sequence indicating how long each part of the stimulus takes to run. This may simplify the process for customers to deploy and may provide the results automatically into a graphical format.

The pseudocode provided below shows a basic implementation of profiling process 10 without a graphical user interface or printing and post processing user variables:

```
#include <stdint.h>
#include <stdio.h>
#include <time.h>
#include <inttypes.h>
int   callNumber = 0;
int   firstCall = 1;
struct timespec startTime;
struct timespec lastTime;
struct timespec currentTime;
#ifdef __cplusplus
#include <iostream>
   extern "C" {
#endif
void c_profile(const char* name) {
   callNumber++;
   if (firstCall == 1) {
        clock_gettime(CLOCK_PROCESS_CPUTIME _ID, &startTime);
        firstCall = 0;
        printf("\nPROFILE_INLINE:: Name: %s #%0d \n ",
                          name, callNumber);
   } else {
        clock_gettime(CLOCK_PROCESS_CPUTIME _ID,
        ¤tTime);
        double elapsed;
        double delta;
        elapsed = (currentTime.tv_sec - startTime.tv_sec );
        elapsed += (currentTime.tv_nsec - startTime.tv_nsec) /
        1000000000.0;
        delta = (currentTime.tv_sec - lastTime.tv_sec );
        delta += (currentTime.tv_nsec - lastTime.tv_nsec ) /
        1000000000.0;
        printf ("\nPROFILE_INLINE:: Name: %s #%0d Incremental Time:
%4.2fs Delta Time: %4.2fs \n ",
                          name, callNumber, elapsed, delta);
   }
   clock_gettime(CLOCK_PROCESS_CPUTIME _ID, &lastTime);
}
#ifdef __cplusplus
   }
#endif
```

An example of the output from an embodiment of profiling process is provided below. In this particular example, the italicized code indicates the output from a breakpoint. The underlined code indicates the output from a watch point inserted inline in the code:

PROFILE_INLINE:: Name: before my sequence #1, frame address 0x300 OVM_INFO file_readsequence.sv(82) @ 0: reporter [my_sequence] running body OVM_INFO file_read_sequence.sv(89) @ 200000: reporter [my_sequence] finished running body PROFILE_INLINE:: Name: after my sequence1 #2 Incremental Time: 8.72 s Delta Time: 8.72 s, frame address 0x400 OVM INFO file_read_sequence.sv(82) @ 200000: reporter [my_sequence] running body OVM_INFO file_read_sequence.sv(89) @ 400000: reporter [my_sequence] finished running body PROFILE_INLINE:: Name: after my_sequence2 #3 Incremental Time: 17.43 s Delta Time: 8.70 s, frame address 0x500

The example provided below may rely on the system up time rather than the process time. The results may be effected by the other processes running on the system. This may be applied anywhere a breakpoint can be inserted. Breakpoints may also be easily enabled or disabled allowing fine control.

0 FS+20 (stop 1: ./file_read_sequence.sv:146) PROFILE BREAKPONT::Time: 422871.14 s OVM_INFO file_read_sequence.sv(146) @ 0: ovm_test_top [ovm_test_top] starting run OVM_INFO file_read_sequence.sv(82) @ 0: reporter [my_sequence] running body OVM_INFO file_read_sequence.sv(89) @ 200000: reporter [my_sequence] finished running body OVM_INFO file_read_sequence.sv(82) @ 200000: reporter [my_sequence] running body OVM_INFO file_read_sequence.sv(89) @ 400000: reporter [my_sequence] finished running body 400 US+3 (stop 2: ./file_readsequence.sv:152) PROFILE-BREAKPONT::Time: 422895.00 s In some embodiments, profiling process 10 may include a shared object that may be loaded into a simulator that measures time (e.g. in microseconds and CPU ticks). This shared object has an interface that can be called with additional information allowing user data to be recorded as well as the time of each call. The simulator memory footprint may also recorded be at each call.

In some embodiments, profiling process 10 may be provided as an extension to the UVM library that adds calls to the interface described above at the start and end of sequences and/or at the start and end of transactions.

In some embodiments, profiling process 10 may allow a user to insert calls in their simulation at the points they are interested in. For example, a user may insert a call at the start of a frame and at the interrupt that signals the end of frame processing. The user may also insert details about the frame to be recorded in the call and obtain information about how aspects of the frame impact the simulation time of the frame. By adding these calls automatically to the start and end of stimulus (like sequences in the UVM library) a tree may be displayed that depicts the life of each sequence and how it ran in parallel with the other sequences.

In some embodiments, adding the calls automatically to the transactions may allow for similar view for transactions. This may be used, as an example, to show how processor bus writes take different lengths of time to process based on the address they relate to. In a large system this may provide an insight into which blocks would benefit most from developing back door loading.

In some embodiments, profiling process 10 may provide a graphical view that may represent the duration of each sequence and transaction and may also provide a unique view into the time each sequence takes. This view may also incorporate the simulation time, providing another unique view of the simulation run. In some embodiments, profiling process 10 may allow for numerous views to be displayed (e.g., wall clock time and simulation time). The display may be similar in nature to that shown in FIG. 3, however, any or all of the additional visualizations discussed herein may be included as well.

In some embodiments, the start point for timing and the end point may be the same point in the code. For example, profiling process 10 may allow for a user to time the length of time to get back to the same point again. In this way, profiling process 10 may calculate the wall clock time to get from one part of the code to another (or back to the same part again). In contrast, existing profilers are configured to stop a simulation periodically and ask the engine what it is doing.

In some embodiments, EDA application 20 and/or profiling process 10 may be configured to perform testbench automation, reuse, and analysis to verify designs from the system level, through RTL, to the gate level. EDA application 20 may support a metric-driven approach and may utilize a native-compiled architecture in order to speed the simultaneous simulation of transaction-level, behavioral, low-power, RTL, and gate-level models.

In some embodiments, EDA application 20 and/or profiling process 10 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 and/or profiling process 10 may be configured to fuel testbench automation, analysis, and reuse for increased productivity. EDA application 20 may be configured to ensures verification quality by tracking industry-standard coverage metrics, including functional, transactional, low-power, and HDL code, plus automatic data and assertion checking. EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may supports e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators. EDA application 20 may incorporate some or all of the aspects of profiling process 10 described herein.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design simulation using a profiler comprising:
   simulating, using a computing device, an electronic design associated with a programming language;
   recording a first time corresponding to a first user-defined point in a simulation;
   recording a second time corresponding to a second user-defined point in the simulation;
   determining a difference in time between the first and second times; and
   displaying a non-waveform, numerical-based visualization including the first time, the second time, a value of a variable at the first time, a value of the variable at the second time, and the difference in time, wherein the non-waveform based visualization includes a tree display having one or more user-selectable sub-portions and wherein each of the one or more user-selectable sub-portions is configured to display a percentage of resources consumed during the simulation;
   accessing the electronic design using a direct programming interface (DPI); and
   using the electronic design, at least in part, to fabricate an integrated circuit or printed circuit board.

2. The computer-implemented method of claim 1, wherein the programming language is one of C, C++, Verilog, and SystemVerilog.

3. The computer-implemented method of claim 1, wherein the first user-defined point is associated with a breakpoint in a graphical debugging environment.

4. The computer-implemented method of claim 1, wherein the profiler is associated with a base class library.

5. The computer-implemented method of claim 1, wherein the first user-defined point in the simulation corresponds to a starting point in the simulation and the second user-defined point corresponds to an ending point in the simulation.

6. The computer-implemented method of claim 1, further comprising:
   identifying the value of the variable at the first time.

7. A non-transitory computer-readable storage medium for electronic design simulation using a profiler, the computer-readable storage medium having stored thereon instructions that when executed by a machine result in the following operations:
   simulating, using a computing device, an electronic design associated with a programming language;
   recording a first time corresponding to a first user-defined point in a simulation;
   recording a second time corresponding to a second user-defined point in the simulation;
   determining a difference in time between the first and second times;
   displaying a non-waveform, numerical-based visualization including the first time, the second time, a value of a variable at the first time, a value of the variable at the second time, and the difference in time, wherein the non-waveform based visualization includes a tree display having one or more user-selectable sub-portions and wherein each of the one or more user-selectable sub-portions is configured to display a percentage of resources consumed during the simulation;
   accessing the electronic design using a direct programming interface (DPI); and
   using the electronic design, at least in part, to fabricate an integrated circuit or printed circuit board.

8. The computer-readable storage medium of claim 7, wherein the programming language is one of C, C++, Verilog, and SystemVerilog.

9. The computer-readable storage medium of claim 7, wherein the first user-defined point is associated with a breakpoint in a graphical debugging environment.

10. The computer-readable storage medium of claim 7, wherein the profiler is associated with a base class library.

11. The computer-readable storage medium of claim 7, wherein the first user-defined point in the simulation corresponds to a starting point in the simulation and the second user-defined point corresponds to an ending point in the simulation.

12. The computer-readable storage medium of claim 7, further comprising:
   identifying the value of the variable at the first time.

* * * * *